United States Patent
McGuffie et al.

(10) Patent No.: US 7,596,508 B1
(45) Date of Patent: Sep. 29, 2009

(54) METHOD AND SYSTEM FOR CONFIGURING AND ORDERING CONSUMER PRODUCT

(75) Inventors: David A. McGuffie, Keego Harbor, MI (US); John W. Burns, Birmingham, MI (US); Jeffrey M. Liedel, Canton, MI (US); J. Kevin Vasconi, Ann Arbor, MI (US); Leo W. Darley, Ann Arbor, MI (US); Thomas D. Cornellier, Wixon, MI (US); Thor Ibsen, Birmingham, MI (US)

(73) Assignee: Ford Motor Company, Dearborn, MI (US)

( * ) Notice: Subject to any disclaimer, the term of this patent is extended or adjusted under 35 U.S.C. 154(b) by 1378 days.

(21) Appl. No.: 09/561,644

(22) Filed: May 2, 2000

Related U.S. Application Data

(60) Provisional application No. 60/163,755, filed on Nov. 5, 1999.

(51) Int. Cl.
  *G06Q 30/00* (2006.01)
(52) U.S. Cl. .......................................... 705/26; 705/27
(58) Field of Classification Search .................... 705/26, 705/27, 28, 29
  See application file for complete search history.

(56) References Cited

U.S. PATENT DOCUMENTS

| | | | |
|---|---|---|---|
| 4,887,208 A * | 12/1989 | Schneider et al. ............ | 235/385 |
| 5,101,352 A * | 3/1992 | Rembert ........................ | 705/8 |
| 5,757,917 A | 5/1998 | Rose et al. | |
| 5,765,139 A | 6/1998 | Bondy | |
| 5,774,873 A | 6/1998 | Berent et al. .................. | 705/26 |
| 5,794,219 A | 8/1998 | Brown ......................... | 705/37 |
| 5,802,497 A | 9/1998 | Manasse | |
| 5,809,479 A | 9/1998 | Martin et al. | |
| 5,826,241 A | 10/1998 | Stein et al. | |

(Continued)

OTHER PUBLICATIONS

Wilder, C. "GM Answers Web Rivals," Informationweek (May 11, 1998).*

(Continued)

*Primary Examiner*—F. Zeender
*Assistant Examiner*—M. Thein
(74) *Attorney, Agent, or Firm*—Raymond L. Coppiellie; Brooks Kushman P.C.

(57) ABSTRACT

A system and method (100, 310, 510) of inventory tracking and custom ordering over a computer network (316). The system includes a multimedia user interface (318) delivered over the computer network to a user, and a configuration and pricing database (324) storing product pricing data according to user-entered product configuration. An inventory database (322) stores product availability data in inventory of retail sales facilities, in-transit from product manufacturing facilities to the retail sales facilities, in-plant at the product manufacturing facilities, and on a ordering bank at the product manufacturing facilities. The user is able to search, via the multimedia user interface (318), the inventory database (322) for the user-entered product configuration and receive pricing data and product availability data. A sales processor (332) is operable to receive, via the multimedia user interface (318), user reservation of an available product determined by the search. An order processor (352) is operable to receive, via the multimedia user interface, a custom order for a product not available in inventory from the user. A status processor (354) also provides the user product availability status report.

24 Claims, 5 Drawing Sheets

U.S. PATENT DOCUMENTS

| | | | |
|---|---|---|---|
| 5,839,112 A | 11/1998 | Schreitmueller et al. | |
| 5,878,401 A * | 3/1999 | Joseph | 705/22 |
| 5,884,300 A | 3/1999 | Brockman | |
| 5,887,271 A | 3/1999 | Powell | |
| 5,890,137 A | 3/1999 | Koreeda | |
| 5,890,138 A | 3/1999 | Godin et al. | 705/26 |
| 5,895,454 A | 4/1999 | Harrington | |
| 5,897,622 A | 4/1999 | Blinn et al. | |
| 5,899,980 A | 5/1999 | Wilf et al. | |
| 5,905,974 A | 5/1999 | Fraser et al. | 705/37 |
| 5,905,975 A | 5/1999 | Ausubel | 705/37 |
| 5,913,210 A | 6/1999 | Call | |
| 5,950,173 A | 9/1999 | Perkowski | |
| 5,960,408 A | 9/1999 | Martin et al. | 705/11 |
| 5,960,411 A | 9/1999 | Hartman | |
| 5,966,697 A * | 10/1999 | Fergerson et al. | 235/375 |
| 5,970,472 A | 10/1999 | Allsop et al. | 705/26 |
| 5,970,475 A | 10/1999 | Barnes et al. | 705/27 |
| 5,983,199 A | 11/1999 | Kaneko | |
| 5,991,739 A | 11/1999 | Cupps et al. | |
| 6,006,201 A * | 12/1999 | Berent et al. | 705/25 |
| 6,009,413 A | 12/1999 | Webber et al. | |
| 6,012,045 A | 1/2000 | Barzilai et al. | 705/37 |
| 6,014,628 A | 1/2000 | Kovarik, Jr. | |
| 6,016,504 A | 1/2000 | Arnold et al. | |
| 6,023,683 A * | 2/2000 | Johnson et al. | 705/1 |
| 6,041,310 A * | 3/2000 | Green et al. | 705/27 |
| 6,070,149 A * | 5/2000 | Tavor et al. | 705/26 |
| 6,083,267 A * | 7/2000 | Motomiya et al. | 345/764 |
| 6,282,517 B1 * | 8/2001 | Wolfe et al. | 705/26 |
| 6,282,518 B1 * | 8/2001 | Farrell et al. | 700/231 |

OTHER PUBLICATIONS

Weston, R. "Web Automation," PC Week (Jul. 28, 1997).*
Gignac, T. "Descartes tracks inventory through cyberspace," Computer Dealer News, vol. 14, No. 48 (Dec. 21, 1998).*
"Auto-By-Tel's Used Car Cyberstore is Only Internet Service to Protect Consumers by Offering Certified, Warrantied Used Vehicles," PR Newswire (Feb. 3, 1997).*
Falkenberg, L. "Virtually made to order," Money, vol. 1, No. 2 (Fall 1998) pp. 60-61.*
"Plymouth image gets polished," Pantagraph (Jan. 4, 1996).*
"Mercedes-Benz Launches New Interactive Retail Initiative," PR Newswire (Sep. 11, 1998).*
Wallace, B. "Drive to the Web—Automakers Fight Back As Online Services Challenge Traditional Business Models," InformationWeek (Sep. 27, 1999).*
Scheck, S. "ScanFast tracks inventory online," Electronic Buyer's News (Nov. 30, 1998).*
Marjorie, S. "Straight From the Top," Automotive Industries, vol. 179, No. 11 (Nov. 1999) p. 41.*
Moad, J. "Web overhaul," PC Week, vol. 13, No. 51 (Dec. 23, 1996).*
"Online Automobile Ordering," Newsbytes (Feb. 12, 1996).*
"Trilogy to tie Selling Chain to sales automation, OLAP," PC Week (Jul. 29, 1996).*
http://www.webarchive.org/web/19961019073203/www.autobytel.com/form1.html.*
Lamonica, M. "Life after ERP: E-business shakes up the manufacturing industry with a push for optimization and supply-chain integration," Infoworld, vol. 21, No. 33 (Aug. 16, 1999) p. 24.*
"GE Supply Net Now Available To All Customers; Real-Time, On-Line Service Makes Ordering Easier, More Efficient," Business Wire (Nov. 19, 1998).*
Trunk, C. "WMS and MRP II: high-tech, fast-paced manufacturing" Material Handling Engineering, vol. 54, No. 5 (May 1999).*
"MicroAge's Ecadvantage™ 3.0 Drives Power to the Reseller" PR Newswire (Apr. 29, 1997).*
Thomas, G. "Product configuration for 'to-order' industries" IIE Solutions, vol. 28, No. 3 (Mar. 1996).*
"Auto firm build multimedia app to link its dealers" (Cooney, Michael. May 2, 1994. Network World).*
"On the road to customer satisfaction" (Dourado, Phil. Jan. 15, 1996. The Independent).*
"Selectica Powers BMW north America Virtual Center with Custom Configuration Capabilities" (Anonymous. Apr. 12, 1999. PR Newswire).*
"Renault Trucking enhances Direct Sales through Web" (Borzo, Jeanette. Mar. 29, 1999, InfoWorld).*
"How Information Technology is Changing the Way cars are Bought" (Anonymous. Jun. 1998. Automotive Components Analyst) [volvonet].*
"GM Proposes a Build-to-Order Business—But Custom Online Sales Provide a Daunting Challenge for Car Makers" (Simison, Robert L. Feb. 22, 2000. Asian Wall Street Journal).*
"Play the Numbers" (Fulcher, Jim. Aug. 1997. Manufacturing Systems).*
"Enabling the Channel for e-business" (Schwartz, Ephram. Apr. 24, 2000. InfoWorld).*
http://www.ford.com/default.asp?pageid=114 Buyer Connection.
http://www.gateway.com/home/index.shtml Choose.
wysiwyg://45/http://www.gmbuyerpower...yPower.applications. Session.Driver GM Buy Power.
http://www.autobytel.com/content/buy/NewIndex.cfm?id=abt New Car Purchase Center.
wysiwyg://132http://carpoint.msn.com/home/New.asp MSN Car Point.
U.S. Appl. No. 09/532,833 entitled *Method of Conducting Online Competitive Price Quoting Events*, filed Mar. 21, 2000, 60 pages.
U.S. Appl. No. 09/538,516 entitled *Communication Schema of Online System and Method of Status Inquiry and Tracking Related to Orders for Consumer Product Having Specific Configurations*, filed Mar. 29, 2002, 122 pages.
U.S. Appl. No. 09/537,190 entitled *Online System and Method of Status Inquiry and Tracking Related to Orders for Consumer Product Having Specific Configurations*, filed Mar. 29, 2000, 118 pages.
U.S. Appl. No. 09/539,392 entitled *Online System and Method of Locating Consumer Product Having Specific Configurations in the Enterprise Production Pipeline and Inventory*, filed Mar. 31, 2000, 120 pages.
U.S. Appl. No. 09/542,413 entitled *Online System and Method of Reporting Related to Orders for Consumer Product Having Specific Configurations*, filed Apr. 1, 2000, 119 pages.
U.S. Appl. No. 09/542,637 entitled *Communication Schema of Online System and Method of Ordering Consumer Product Having Specific Configurations*, filed Apr. 4, 2000, 122 pages.
U.S. Appl. No. 09/543,833 entitled *Communication Schema of Online Reporting System and Method Related to Online Orders for Consumer Products Having Specific Configurations*, filed Apr. 5, 2000, 118 pages.
U.S. Appl. No. 09/543,686 entitled *Online System and Method of Ordering and Specifying Consumer Product Having Specific Configurations*, Apr. 5, 2000, 119 pages.
U.S. Appl. No. 09/543,860 entitled *Communication Schema of Online System and Method of Locating Consumer Product in the Enterprise Production Pipeline*, filed Apr. 5, 2000, 135 pages.
MSN CarPoint web page at http://carpoint.msn.com/newcar/default.asp?src=home New-Car buying service, © 2000, 5 pages.
ATKearney, "Creating Supply Advantage$^{SM}$," Computer-Aided Sourcing System, $CAS^3$ Auction Discussion at Ford, Mar. 19, 1999, 19 pages.
FreeMarkets Online™, Online Industrial Market Making Brochure, date unknown, pp. 1-12.
Timothy Aeppel, "Bidding for E-Nuts and E-Bolts On the Net," Reprinted from *The Wall Street Journal*, Mar. 12, 1999, 2 pages.
Glen Meakem, "How Bazaar," *CIO WebBusiness*, Section Two, Aug. 1, 1998, 5 pages.
FreeMarkets, *Publicity*, <http://www.freemarkets.com/scripts/publicity.asp>, date unknown, 10 pages.
"The $300 Billion Stealth Economy," *Inc. Technology* 1998, No. 3, reprinted with permission of *Inc.* magazine, copyright 1998, *Goldhirsh Group, Inc.*, 4 pages.

Scott Woolley, "E-muscle," Technology Web Solver, undated, reprinted by permission of *FORBES* magazine, Mar. 9, 1998 Issue, © 1998, *FORBES Inc.*, 1 page.

Clinton Wilder, "Electronic Purchasing—What's Your Bid," *Informationweek*, Nov. 10, 1997, 4 pages.

Robert D. Hof, "the Buyer Always Wins," *BusinessWeek*, undated, reprinted from *Business Week*, Mar. 22, 1999 copyright by *The McGraw-Hill Companies, Inc.*, 2 pages.

UBid.com Help Pages, <wysiwyg://8/http://www.ubid.com/help/auctions.asp>, date unknown, 11 pages.

BuyGroup.com web page, <http://ag.buygroup.com/>, date unknown, 3 pages.

CattelOfferings.com web page, <http://www.CattleOfferings.com/>, *Cattle Offerings Worldwide & Farms.com*, copyright 1999, 10 pages.

Marex.com web page, <http://www.marex.com/about/about.asp>, date unknown, 2 page.

FastParts.com web page, <http://webt1.sanjose.fastparts.com/>, date unknown, 4 pages.

MetalSite web page, <http://www.MetalSite.com/>, *MetalSite, L.P.*, copyright 1999, 8 pages.

Chemdex Accelerating Science web page, <wysiwyg://36/http://www.Chemdex.com/about_chemdex/index.html>, *Chemdex Corporation*, copyright 1999, 32 pages.

eBay™ web page, <wysiwyg://19/http://www.ebay.com/index.html>, *eBay, Inc.*, copyright 1995-2000, 26 pages.

Ford Motor Company, <http://www.ford.com/>, last visited Mar. 23, 2002 @ 3:17 PM.

\* cited by examiner

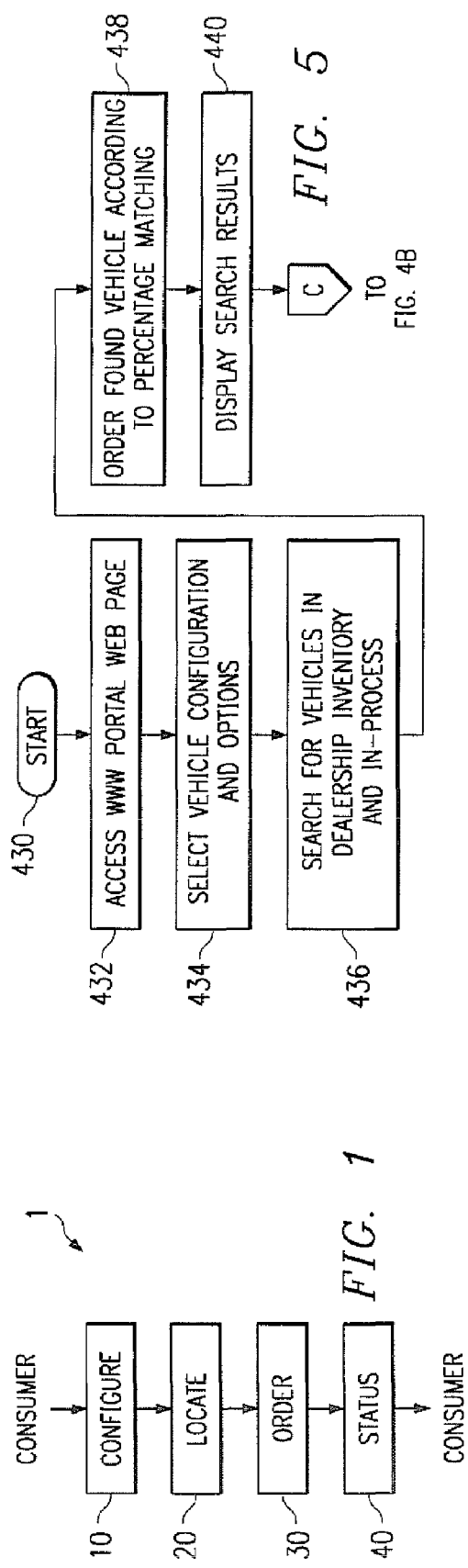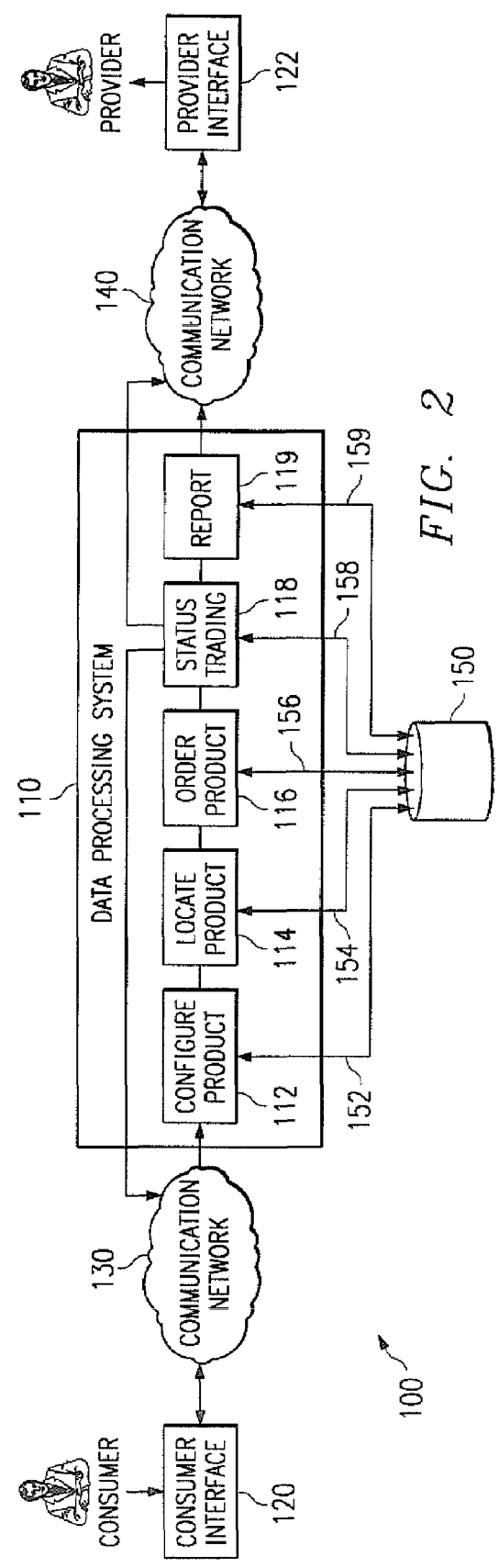

METHOD AND SYSTEM FOR CONFIGURING AND ORDERING CONSUMER PRODUCT

RELATED PATENT APPLICATIONS

This application claims the benefit of U.S. Provisional Application No. 60/163,755, entitled Automotive Internet Business Methods and Systems, and filed on Nov. 5, 1999.

TECHNICAL FIELD OF THE INVENTION

The present invention relates in general to the field of electronic commerce and computer software systems. More particularly, the invention relates to an on-line method and system for product ordering and tracking.

BACKGROUND OF THE INVENTION

On-line shopping is quickly becoming the preferred means for obtaining consumer products and services. More consumers, for example, are now using the Internet to browse, comparison shop and order products on-line. On-line shopping systems have made product information, including pricing and availability, readily available to consumers and have facilitated the location and purchasing of desired products at lower cost and with added convenience.

Accordingly, many retailers have established "electronic store fronts" to offer all kinds of products ranging from clothes and groceries to computers and automobiles. Conventional electronic store fronts, however, are often modeled after traditional catalogs and are limited in the information disseminated to the consumer. With typical electronic store fronts, for example, a consumer is prompted to search for a desired product by entering one or more keywords. A search result of relevant items is then displayed along with a product description and price. The customer then places the desired items in an "electronic shopping cart," which the customer uses to place an order with the on-line merchant. If an item is not in the merchant's inventory, the customer is informed either immediately or within a prescribed period of time. If the customer is dissatisfied or unwilling to wait or desires to purchase the item elsewhere, the customer then returns to the store front or calls the on-line merchant to cancel or change the order.

Still other systems, such as Dell Computer Corporation's dell.com, allow consumers to configure or customize selected products in accordance with available features or options. Dell.com, for example, allows a consumer to customize computer systems by allowing the consumer to select various options, e.g., memory, hard drive, monitor, CD/DVD drives, video card, sound card, etc. An updated price is then obtained based on the selected options. The configured system is placed in a shopping cart and an order submitted by selecting a "checkout" option. Order status information can then be obtained upon providing an order number and verification data.

A shortcoming of conventional systems, however, is that product status and tracking information is available only after an order is placed. No information is available to the consumer, prior to the placement of the order, relating to the availability or status of a matching or similar configured product already in the product's manufacturing and delivery process or so-called "product pipeline." For example, conventional systems do not provide real-time information relating to inventory, in-transit stock, scheduled and unscheduled orders, etc., that may influence the consumer's decision to order or not order the configured product. Such information may be important to a consumer who may choose to select or not select a particular option because of a lack of inventory or delay in scheduled production. Also, in cases where time is of the essence, such information may be used to notify a customer that the configured product is not readily available. A new order can therefore be placed or a preexisting one updated without the customer having to cancel a previously submitted order. The availability of status and tracking information, prior to the placement of an order by the consumer, can therefore be used to minimize the risk that the customer will become inconvenienced and dissatisfied with the merchant's on-line ordering services.

SUMMARY OF THE INVENTION

The aforedescribed limitations and inadequacies of on-line shopping systems are substantially overcome by the present invention. The present invention provides a method and system wherein a consumer is provided real-time information, prior to the placement of an order or purchase by the consumer, regarding the availability and status of a configured product in relation to the product's manufacturing and delivery process or "pipeline."

The present invention provides an on-line method and system wherein the product delivery time to a consumer is reduced by locating and "tagging" an available product already in a product pipeline. The present invention allows a consumer to locate and tag the desired product at various stages of the pipeline, including but not limited to scheduled and unscheduled order banks, final assembly, in-plant inventory, in-transit stock, dealer inventory, etc. A located product may be tagged, for example, using a customer credit card, checking account number or electronic voucher or gift certificate.

The present invention provides an on-line method and system wherein the consumer configures a product as required and places a product order when no acceptable matches are found in the product pipeline. Alternatively, pre-existing or even canceled orders can be modified as required to fulfill the product order.

The invention also provides an on-line method and system wherein expected delivery dates are calculated and updated based upon the progress of an ordered or tagged product through the product pipeline.

The present invention also provides an on-line method and system wherein real-time pricing and comparison data is provided for individual product features or options.

The present invention also provides an on-line method and system wherein a consumer tracks the progress of an ordered product through the product pipeline.

Real-time status can be provided as requested or automatically in accordance with the occurrence of a predefined or significant event.

The present invention provides an on-line method and system wherein consumer preferences and trends are reported.

Therefore, in accordance with a preferred method of the present invention, an on-line method for product ordering and tracking is provided that substantially overcomes the shortcomings of traditional systems. The method includes the steps of: configuring a product as desired based upon available product features or options; locating within a product pipeline an in-process product that matches or is similar to the configured product; ordering the configured product if the located in-process is unacceptable, not suitably available or otherwise cannot be located; and providing real-time status and tracking information regarding the progress of the ordered product through the product pipeline. Alternatively, if a matching or similar in-process product is located and is acceptable and suitably available, then the in-process product is "tagged" and an appropriate message is sent to the consumer notifying him or her that such product has been tagged.

In accordance with another preferred method of the present invention, a method for product ordering and tracking over a computer network includes the steps of providing a multimedia user interface delivered over the computer network to a user, receiving user input indicative of desired product configuration, and accessing a product configuration and pricing database and displaying available product configuration and product pricing data according to the user-entered product configuration. The method further accesses an inventory database storing product availability data in inventory of retail sales facilities, in-transit from product manufacturing facilities to the retail sales facilities, in-plant at the product manufacturing facilities, and on a ordering bank at the product manufacturing facilities of a product configuration entered by the user. Product availability determined by the search is displayed to the user. The method further includes the steps of receiving, via the multimedia user interface, user reservation of an available product determined by the search, and receiving, via the multimedia user interface, a custom order for a product not available in inventory from the user. One or more product availability status reports are then generated and transmitted to the user.

In accordance with yet another preferred method of the present invention, a method of product ordering and tracking over the Internet includes the steps of accessing a portal web page linked to a plurality of web pages, selecting, by making input on the plurality of web pages, vehicle make, model, configuration and options, and accessing a product configuration and pricing database and displaying available product configuration and product pricing data according to the user input. The method further includes the steps of searching an inventory database storing product availability data in inventory of at least one dealership, in-transit from at least one product manufacturing facility to the at least one dealership, in-plant at the at least one product manufacturing facility, and on a ordering bank at the at least one manufacturing facility, for a product configuration entered by the user. Product availability is then displayed to the user on a web page. The user may reserve an available product.

In another aspect of the present invention, a system is provided for product ordering and tracking over a computer network. The system includes a multimedia user interface delivered over the computer network to a user, and a configuration and pricing database storing product pricing data according to user-entered product configuration. An inventory database stores product availability data in inventory of retail sales facilities, in-transit from product manufacturing facilities to the retail sales facilities, in-plant at the product manufacturing facilities, and on a ordering bank at the product manufacturing facilities. The user is able to search, via the multimedia user interface, the inventory database for the user-entered product configuration and receive pricing data and product availability data. A sales processor is operable to receive, via the multimedia user interface, user reservation of an available product determined by the search. An order processor is operable to receive, via the multimedia user interface, a custom order for a product not available in inventory from the user. A status processor also provides the user product availability status reports.

BRIEF DESCRIPTION OF THE DRAWINGS

For a better understanding of the present invention and the advantages thereof, reference may be made to the accompanying drawings, in which:

FIG. 1 is a flow diagram showing a method for product ordering and tracking according to a preferred embodiment of the present invention;

FIG. 2 is a preferred embodiment of a system for implementing the method shown in FIG. 1;

FIG. 5 is a flowchart of an alternate method of searching for and locating a vehicle.

DETAILED DESCRIPTION OF THE INVENTION

Figure 3:
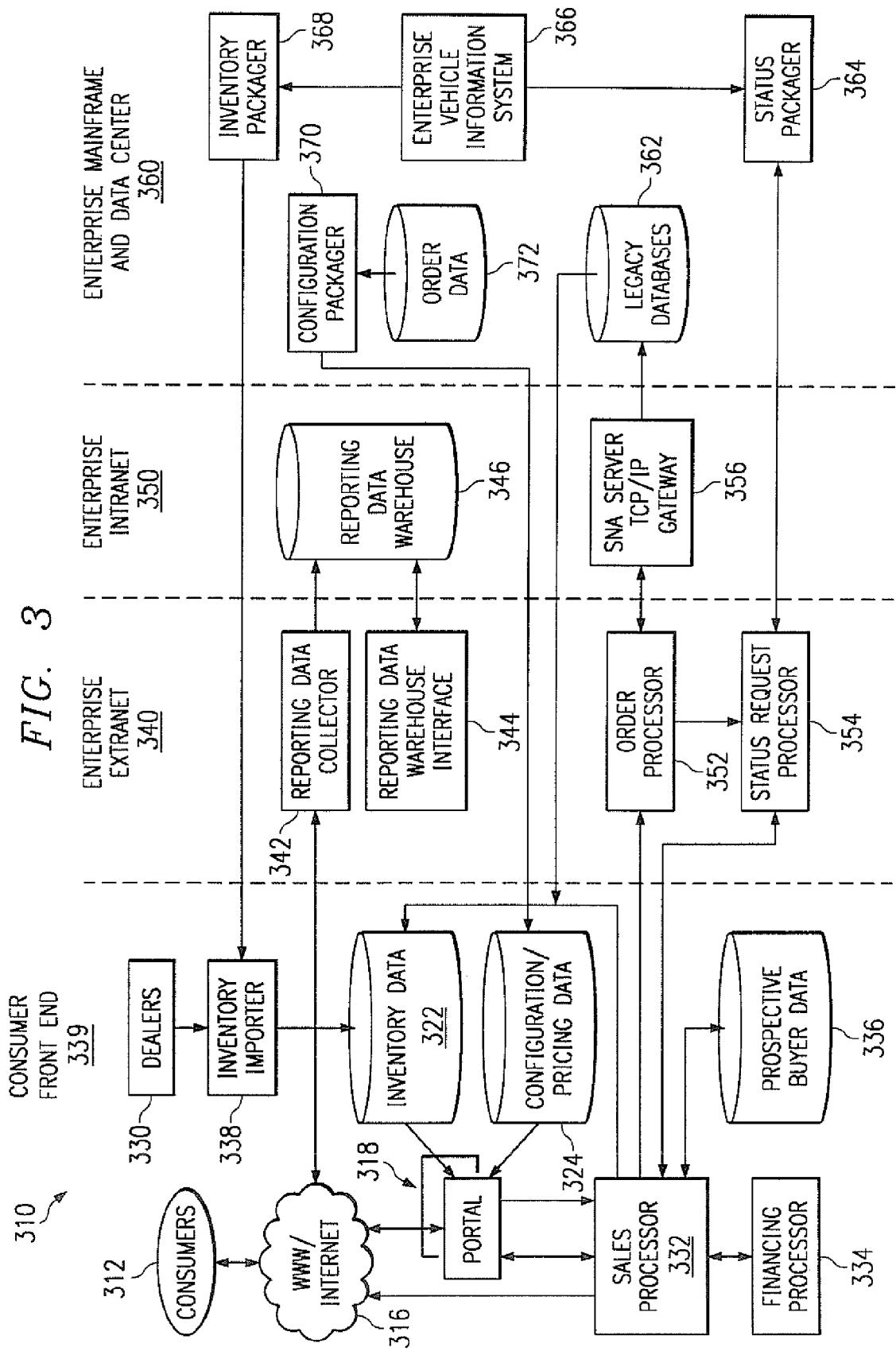
FIG. 3 is a block diagram of an embodiment of the web-based custom vehicle ordering and tracking system constructed according to the teachings of the present invention.

As described above, there is a need to provide immediate feedback to on-line customers as to the availability of selected merchandise. Furthermore, it is advantageous to somehow satisfy the customer's order even when the selected item is not in inventory. Although these features are desirable for any on-line merchant, they are especially advantageous for big-ticket items such as automobiles where a single completed sale translates to large dividends.

FIG. 1 is a flow diagram of a preferred method for ordering and tracking consumer products. As shown in FIG. 1, a consumer desiring to purchase a product first selects and configures the product as desired based upon available product features or options, as shown in block 10. Dealer inventory and "in-process" product inventory are then searched to locate products that matched or substantially matched the consumer selected product configuration, as shown in block 20. An in-process product is defined as a product that is on the order bank to be manufactured, a product in the manufacturing process, or a product that is in transit to the retail outlet or dealerships. If no matching or otherwise acceptable at-dealer or in-process product can be located, then the consumer is provided the option to order the configured product, as shown in block 30. If a matching or similar product is located, then the located product is "tagged" or designated for purchase and/or delivery to the consumer. The consumer is then notified that a product has been located and tagged, and may be further notified that the actual purchase or delivery of such product may be conditioned, for example, upon payment or credit verification. The consumer may be warned that there is a possibility that the vehicle has been tagged or sold to someone who may have purchased the vehicle prior to the consumer's effort to locate and tag the vehicle. This may occur due to lag time in updating the inventory databases. The consumer is then provided an estimated product delivery date. Real-time status and tracking information regarding the progress of the ordered or tagged through the product pipeline is also provided, as shown in block 40.

FIG. 2 is a block diagram of a system 100 for product ordering and tracking in accordance with the preferred method of FIG. 1. System 100 includes consumer and product provider user interfaces 120 and 122, respectively, for communicating via networks 130 and 140 with data processing system 110. A "consumer" can be any purchaser or user of a product, and "product provider" can be, for example, a retailer, dealer or even manufacturer of the product offered for sale. The user interfaces 120 and 122 can be any suitable graphical user interfaces for use over any Internet, intranet, extranet, or similar communication network. Communication networks 130 and 140 can be different networks, or the same network. The data processing system 110, which is preferably embodied as one or more computer programs running on a suitable computer processor or processors, includes a configure product routine 112, a locate product routine 114, an order product routine 116 and a status/tracking routine 118 for performing the method of FIG. 1.

As further shown in FIG. 2, a product knowledge base 150 is used by the data processing system to provide real-time configuration, ordering and tracking information to the consumer. Communication link 152, for example, represents configuration and pricing data, business rules and/or other like constraints limiting the options and configurations available to the consumer. Inventory data, which includes, but is not limited to, scheduled and unscheduled order banks, final assembly, in-plant inventory, in-transit stock, dealer inventory, is provided by the knowledge base via link 154. Ordering rules and constraints, including information about the product's manufacturing and delivery process, is provided via link 156. Status related data and rules are likewise provided via link 158.

Further as shown in FIG. 2, system 110 can optionally include a reporting routine 119 for communicating customer trend, preference and other customer-related data to the provider of the product or products offered for sale. Reporting rules and constraints, such as privilege or security data, is provided by product knowledge base 150.

FIG. 3 is a block diagram of a preferred embodiment of a system 310 for product ordering and tracking in accordance with the teachings of the present invention. Although the system 310 is shown as a web-based system for ordering and tracking custom vehicles, the system 310 maybe modified as known and understood with those of skill in the art for ordering and tracking various other consumer products over any intranet, extranet or other suitable type of communications network. System 310 in particular provides on-line customers the ability to enter vehicle search criteria, and search for the vehicle in the dealership inventory and in-process. If the search does not yield a vehicle satisfying the search criteria, then a customer may search for near-match vehicles or place a custom order for the desired vehicle. In this way, the customer is provided immediate feedback as to the availability of the vehicle not only in inventory but also in the pipeline at the manufacturer leading to the dealer. The customer is also afforded satisfactory alternatives that lead to the completion of a sale.

Figure 6:
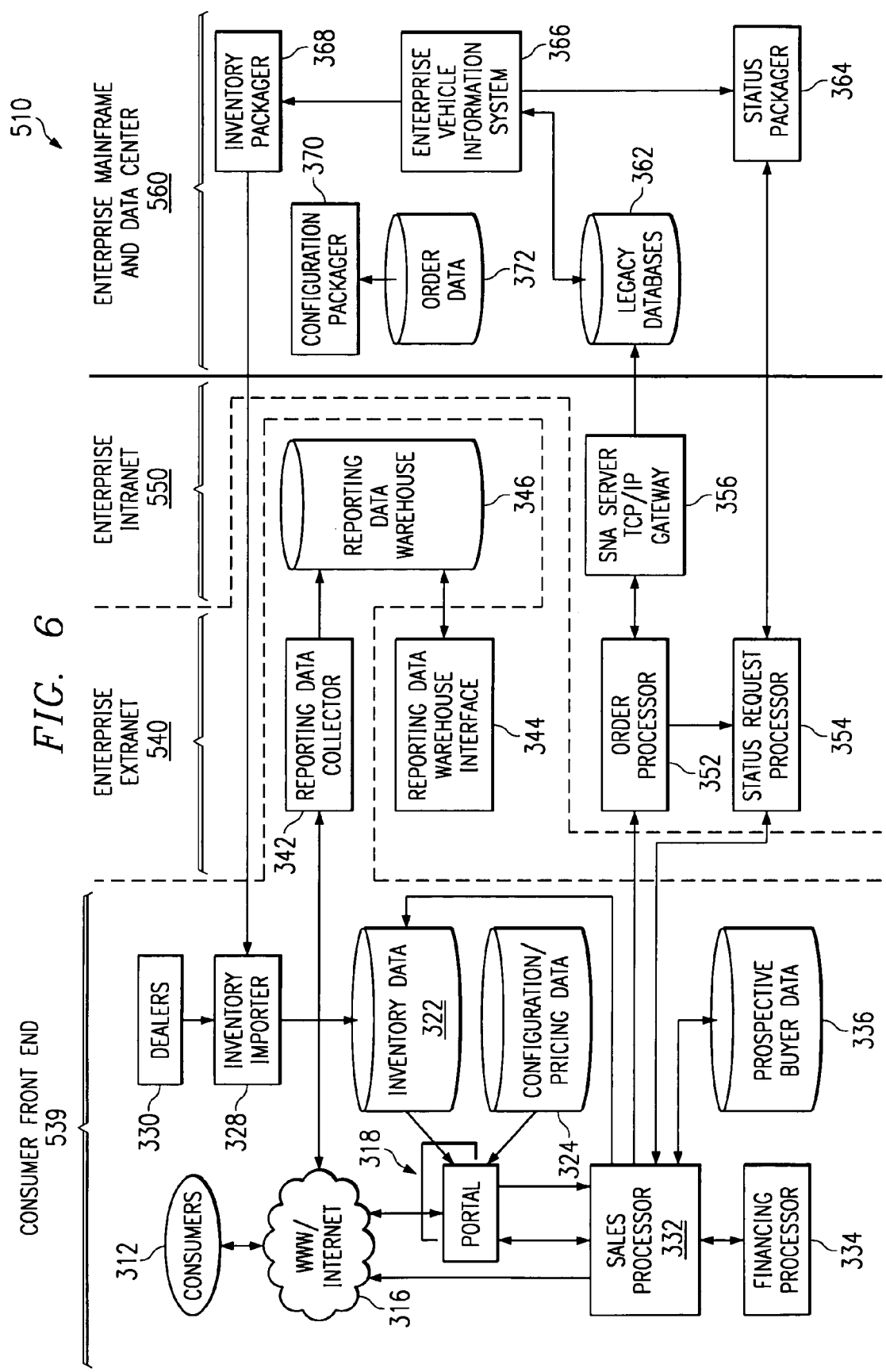
FIG. 6 is an alternate embodiment of a system for implementing the method shown in FIG. 1.

The system 310 of the present invention, by way of example and not limitation, includes consumer "front end" 339, enterprise extranet 340, enterprise intranet 350 and enterprise data center 360. As shown in FIG. 3, consumer front end provides consumer-to-business (C2B) functionality, enterprise extranet 340 provides business-to-business (B2B) functionality and enterprise intranet 350 and enterprise data center 360 provide functionality internal to the enterprise, e.g., the product providing entity. The various system components, however, can be distributed within any of the segments 339, 340, 350 and 360 as required. FIG. 6, for example, shows another preferred embodiment of the present invention wherein a reporting data collector 342 and a reporting data warehouse 346 are shown as part of the consumer front-end 539 instead of the enterprise extranet 340 as previously shown in FIG. 3

Referring again to FIG. 3, the consumer front end 339 includes one or more portals or web sites 318 accessible over the World Wide Web (WWW) or the Internet 316 over which consumers 312 can access the system 310. The system can be accessed using browser software applications running on client computers, machines or devices to download and access files called web pages stored on servers connected to the Internet. Using the same browser applications, consumers can also enter and send information to the servers. The Web pages can be single or multimedia documents created using hypertext markup language (HTML), extensible markup language (XML), all of the HTML and XML variations and extensions, client-side scripting languages, cascading style sheets, Java applets and serverlets, Active Server Pages (ASP), Cold Fusion, and other languages and methods. Portals 318 may include a web page that is part of the manufacturer's web site that contains links to other related web pages and content dedicated to system 310. Portals 318 may also include customizable general purpose web pages that contain short summaries of current news, weather, financial news and serve as a starting point for many web surfers. Portals 318 may also include a web site dedicated to automotive sales of one or more makers, or a web site owned and operated by a dealership selling automobiles of one or more makers. In this manner, portals 318 serve as a multimedia user interface that interfaces between the users and system 310.

Portals 318 are capable of accessing an inventory database 322 and a configuration and pricing database 324. Inventory database 322 contains data related to the availability of any in-process or at-dealership product that may match the specifications dictated by the consumer. Configuration and pricing database 324 contains data on vehicle models and the available configuration and options that may be specified by the consumer. For example, a consumer may desire a white Ford Excursion with cream-colored leather seats, a V10 engine, premium aluminum wheels, and other options. Portal 318 is able to access configuration and pricing database 324 and present the data to the on-line consumer so that the consumer can indicate which configurations and options are desired. The price of the vehicle may be dynamically updated and displayed to reflect the price of the vehicle with the selected vehicle configuration and options. The vehicle configurations and options may be grouped into packages so that the on-line consumer may make his/her selection based on the desired packages.

After the on-line consumer selects the vehicle make and model, configurations and options, he/she may submit the vehicle selection and perform a search in inventory to determine if one is currently available. Inventory database 322 receives its data from an inventory importer 328, which obtains inventory data from dealers 330 for their current inventory. Dealers 330 may also represent any sales entity that has an inventory of products for sale or lease to the public or to businesses. Inventory importer 328 further obtains data from an inventory packager 368 within the enterprise mainframe and data center 360 of the manufacturer for data on vehicles in-transit from the manufacturing plant to the dealers, in manufacturing, and on the order bank. Therefore the entire pipeline is searched for a match or a near match, if so desired. If no match or near match is found, the consumer may place a custom order for the vehicle. Inventory importer 328 is responsible for obtaining the relevant data from one or more sources, reformatting the data as necessary, and storing the data in inventory database 322.

Portals 318 are also in communication with a sales processor 332, which may be owned and operated by a dealership organization or any entity that operates as a retail outlet for the manufacturer. The vehicle selection information submitted by the consumer for purchase or lease is relayed to sales processor 332 for processing. A financing processor 334 may be used to receive and verify customer credit information and to process financing and complete the sale. A consumer who is not currently interested in purchasing or leasing the vehicle may cause the vehicle selection information to be stored, such as at a prospective buyer database 336 or a database that is directly accessible by portals 318. Portals 318 may recall the stored information when the same consumer visits the web site again and allow the consumer to place the order at that time.

Sales processor 332 is also in communication with an order processor 352 that may be part of an enterprise extranet 340 of the company. Communication between the sales processor 332 and the order processor 352 is preferably done using an appropriate messaging scheme and message routers (not shown). Order processor 352 accepts submitted orders from sales processor 332 and communicates the order to legacy databases 362 in enterprise mainframe and data center environment 360 via a systems network architecture (SNA) server transmission control protocol/Internet protocol (TCP/IP) gateway 356. Also in communication with sales processor 332 is a status request processor 354, which may reside in the extranet. Status request processor receives requests from sales processor 332 and obtains the order status from a status packager 364 in enterprise mainframe and data center environment 360. Status packager 364 obtains status information from an enterprise vehicle information system 366, which keeps track of in-plant and in-transit vehicle inventory as well as vehicles on the order bank. Order data database 372 contains vehicle pricing information for vehicle configurations and options. A configuration packager 370 is operable to access order data database 372 and provide this information to configuration/pricing data database 324 at the front end.

Portals 318 are able to collect statistics and personal data on visitors and report this data to a reporting data collector 342 in extranet 340. Traditional means of obtaining data on the visitors, such as using cookie files, user entry forms, and the like may be used to collect data. This data is then stored in a reporting data database 346 in intranet 350. A reporting data warehouse interface 344 is provided for users who have authority to access the data in reporting data database 346. Analysis on the collected data may be performed to achieve a better understanding of potential buyer likes and dislikes and to determine potential buyer profiles.

For security reasons, firewalls separate the World Wide Web and the Internet from extranet 340, which is also separated from enterprise intranet 350 and enterprise mainframe and data center 360 by firewalls. Account identifiers, user identifiers, passwords, etc. are needed to access the extranet, intranet and enterprise mainframe and data center systems.

Figure 4A:
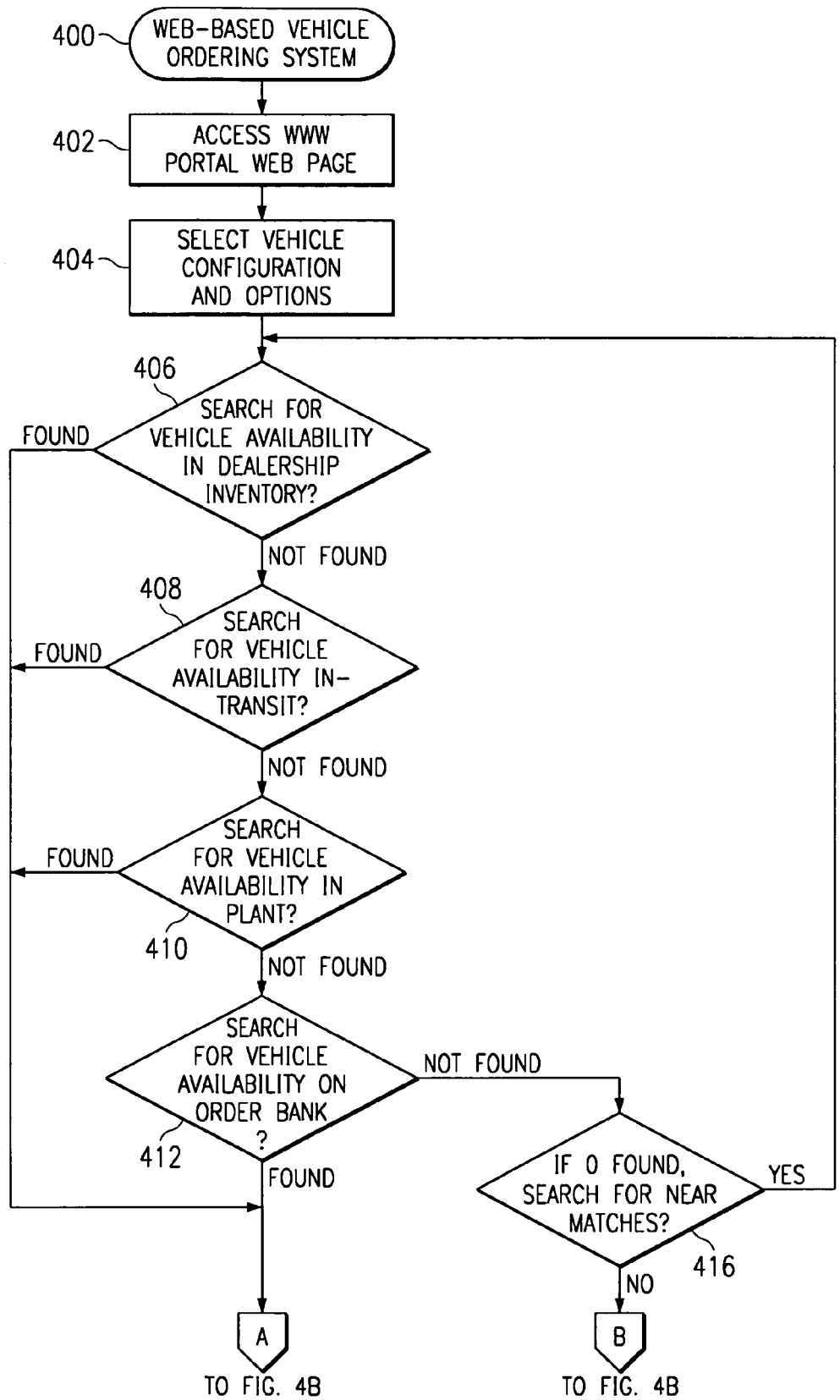
FIGS. 4A-B illustrate a simplified flowchart of an embodiment of the web-based custom vehicle ordering and tracking method according to the teachings of the present invention.
Figure 4B:
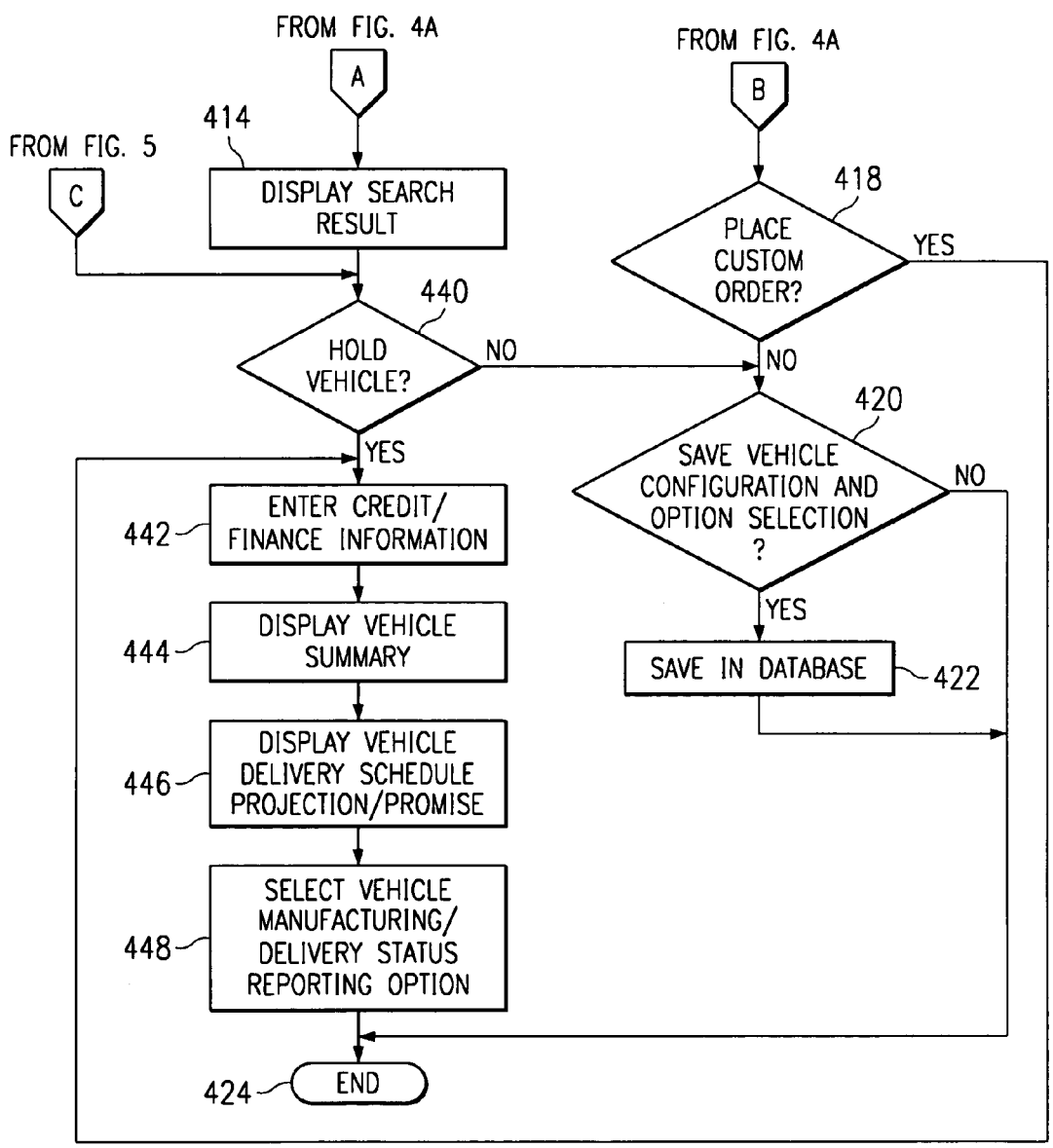

FIG. 4 is a simplified flowchart of an embodiment of the web-based custom vehicle tracking and ordering process 400 according to the teachings of the present invention. A user accesses a World Wide Web portal web page, as shown in block 402. The consumer is then able to enter or select from pull-down lists or other types of lists the vehicle make, model, color, configurations and options, as shown in block 404. System 310 of the present invention then searches for vehicles matching the entered criteria in dealership inventory and in-process. Two alternate methods of searching and locating a matching vehicle are shown in FIGS. 4A-4B and FIG. 5.

Referring to block 406 in FIG. 4A, the system begins by first searching in dealership inventory. The search may be performed by accessing inventory database 322. If a vehicle is not found, system 310 then searches database 322 for matching vehicles that are in-transit, as shown in block 408. If a vehicle is not found, then system 310 searches inventory database 322 for vehicles that are in-plant being manufactured, assembled, etc., as shown in block 410. If such a vehicle is still not located, then system 310 searches for a matching vehicle that is on the order bank to be constructed, as shown in block 412. All vehicles matching the search criteria are displayed, as shown in block 414. If no vehicle matching the criteria is located, then near matches are searched in inventory database 322 if so instructed by the consumer, as shown in block 416.

Referring to FIG. 5, an alternate method 430 of searching for and locating a vehicle matching or substantially matching the entered criteria is shown. Similarly, the consumer accesses the system via portal web pages, and enters desired vehicle configuration and options, as shown in blocks 432 and 434. Dealership inventory and in-process vehicles are searched for a match or near match, as shown in block 436. In block 438, all found vehicles are sorted according to how closely it matched the entered search criteria, from highest percentage to lowest percentage. The sorted found vehicles are then displayed to the consumer, as shown in block 440.

Returning to FIG. 4B, if no match or near match is found, if the consumer does not want to search for near matches, or the consumer is not satisfied with any found vehicle in the search result, the consumer may indicate that he/she desires to place a custom order, as shown in block 418. If the consumer does not desire to place a custom order at this time, then the vehicle selection criteria may be saved in a database, such as prospective buyer database 336, as shown in blocks 420 and 422. The process ends in block 424.

If, on the other hand, the search located a vehicle matching or nearly matching the selection criteria, the consumer may "tag" or place a "hold" on the vehicle, as shown in block 440. In order to reserve a vehicle, the consumer is asked to provide credit and/or other financial information, as shown in block 442. Typically, a consumer is asked to provide a credit card account number from which a predetermined amount or a certain percentage of the vehicle price is charged to hold the selected vehicle. Alternatively, the consumer may opt to merely save the vehicle configuration and option selection and postpone the purchasing decision until later, as shown in block 420. In block 444, after the consumer has decided to hold a vehicle and have provided the credit information, a summary of the selected vehicle and the transaction may be displayed to the consumer. This page may be saved or printed by the consumer as a receipt. In block 446, the vehicle delivery schedule projection may be displayed. The vehicle delivery schedule may indicate that the vehicle is immediately available in the case of ones that are currently on the lots of a dealership or in two months in the case of a custom order, for example. This step may also be performed simultaneously with the search result information in block 414. The consumer may further select a means of reporting the vehicle delivery status and a frequency for the report, as shown in block 448. For example, the consumer may elect to receive status update reports via email, facsimile, or a web page. The status update reports may further provide an updated delivery date, if it is changed from the original date due to changes in the manufacturing or transportation schedule. The process ends in block 424.

FIG. 6 is an alternate embodiment 510 of the present invention similar to that shown in FIG. 3. It may be seen that the boundaries between consumer front end 539, enterprise extranet 540, enterprise intranet 550, and enterprise mainframe and data center 560 may be somewhat flexibly delineated, thus some of the system building blocks may exist in the consumer front end rather than the enterprise extranet, for example. As shown in FIG. 5, reporting data collector 342 and reporting data warehouse 346 may exist in consumer front end 539 instead of enterprise extranet 540 and enterprise intranet 550, respectively. Further, order processor 352 and status request processor 354 may reside in enterprise intranet 550 rather than enterprise extranet 540.

Constructed and operating in this manner, a customer is afforded the opportunity to specify the desired configuration and options of a product to search the inventory for availability. The vehicle available anywhere along the pipeline from the manufacturer and the dealership may be determined. The customer may tag a vehicle that is currently anywhere in the pipeline that fits his/her criteria and reserve it. In the event that the specified product is not currently available, the customer may place a custom order for the product. Therefore, the customer is able to make a purchase on a product or vehicle that he/she desires and track the status of the vehicle when it is custom ordered and manufactured. Although the present invention has been described in the context of custom automotive vehicle inventory tracking and ordering, it is equally applicable to other products for which a consumer may select from among different configurations.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system for ordering and tracking a consumer product over a computer network, comprising:
    a multimedia user interface delivered over the computer network to a user;
    a configuration and pricing database that stores product pricing data according to user-entered product configuration;
    an inventory database that stores product availability data associated with products that are in inventory of retail sales facilities, in-transit from product manufacturing facilities to the retail sales facilities, in-plant at the product manufacturing facilities, and on an ordering bank at the product manufacturing facilities;
    one or more processors collectively operable to:
        in response to receiving a search request for the user-entered product configuration via the multimedia user interface, facilitate a search of the product availability data stored in the inventory database for the user-entered product configuration; and
        communicate pricing data and product availability data based on the search;
    a sales processor operable to receive, via the multimedia user interface, user reservation of an available product determined by the search of the product availability data stored in the inventory database;
    an order processor operable to receive, via the multimedia user interface, a custom order for a product not available in inventory from the user; and
    a status processor operable to provide the user product availability status reports.

2. The system according to claim 1, wherein the computer network includes the Internet.

3. The system according to claim 1, wherein the multimedia user interface includes a web server having access to a plurality of multimedia web pages containing dynamic data retrieved from the inventory database and product configuration and pricing database.

4. The system according to claim 3, wherein the multimedia user interface includes a web browser application operable to communicate with the web server over the Internet, receive and display the multimedia web pages to the user, and transmit user inputs to the web server.

5. The system according to claim 1, further comprising a prospective buyer database operable to store product configuration data and user data received via the multimedia user interface.

6. The system according to claim 1, wherein the status processor is operable to transmit product availability status data to the user via electronic mail.

7. The system according to claim 1, wherein the status processor is operable to transmit product availability status data to the user via a web page.

8. The system according to claim 1, further comprising a financing processor operable to receive and verify user financial information for product reservation or custom order submission.

9. The method according to claim 1, wherein configuring a desired product, searching for the desired product and yielding at least one found product, ordering the desired product, and providing substantially real-time status and tracking information are performed using a computer network.

10. A method of inventory tracking and custom ordering over a computer network, comprising:
    providing a multimedia user interface delivered over the computer network to a user;
    receiving user input indicative of desired product configuration;
    displaying available product configuration and product pricing data according to the user-entered product configuration;
    searching product availability data associated with products that are in inventory of retail sales facilities, in-transit from product manufacturing facilities to the retail sales facilities, in-plant at the product manufacturing facilities, and on an ordering bank at the product manufacturing facilities for one or more products substantially matching a product configuration entered by the user; and
    displaying product availability via the multimedia user interface based on the search of the product availability data;
    receiving, via the multimedia user interface, user reservation of an available product determined by the search of the product availability data;
    receiving, via the multimedia user interface, a custom order for a product not available in inventory from the user; and
    generating and transmitting to the user product availability status reports.

11. The method according to claim 10, wherein the receiving and displaying steps are transmitted over the Internet.

12. The method according to claim 10, wherein the receiving and displaying data to the user steps comprise:
    accessing relevant data from the product availability data and product configuration and pricing database; and
    downloading over the Internet at least one web page containing dynamic data retrieved from the product availability data and product configuration and pricing database.

13. The method according to claim 10, further comprising accessing a prospective buyer database to retrieve and store product configuration data and user data.

14. The method according to claim 10, further comprising transmitting product availability status data to the user via electronic mail.

15. The method according to claim 10, further comprising transmitting product availability status data to the user via a web page.

16. The method according to claim 10, further comprising receiving and verifying user financial information for product reservation or custom order submission.

17. A method of web-based vehicle inventory tracking and custom ordering over the Internet, comprising:
- accessing a portal web page linked to a plurality of web pages;
- selecting, by making input on the plurality of web pages, vehicle make, model, configuration and options;
- accessing a product configuration and pricing database and displaying available product configuration and product pricing data according to user input;
- searching product availability data associated with products that are in inventory of at least one dealership, in-transit from at least one product manufacturing facility to the at least one dealership, in-plant at the at least one product manufacturing facility, and on an ordering bank at the at least one manufacturing facility, for one or more products substantially matching a product configuration entered by a user;
- displaying to the user on a web page product availability, data for products substantially matching the product configuration entered by the user based on the search of the product availability data; and
- receiving user reservation of an available product.

18. The method according to claim 17, further comprising: receiving a custom order from a user for the product not available in inventory; and generating and transmitting to the user at least one product availability status report.

19. The method according to claim 17, wherein the receiving and displaying steps are transmitted over the Internet.

20. The method according to claim 17, wherein the receiving and displaying data to the user steps comprise:
- accessing relevant data from the product availability data and product configuration and pricing database; and
- downloading over the Internet at least one web page containing dynamic data retrieved from the product availability data and product configuration and pricing database.

21. The method according to claim 17, further comprising accessing a prospective buyer database to retrieve and store product configuration data and user data.

22. The method according to claim 17, further comprising transmitting product availability status data to the user via electronic mail.

23. The method according to claim 17, further comprising transmitting product availability status data to the user via a web page.

24. The method according to claim 17, further comprising receiving and verifying user financial information for product reservation or custom order submission.

* * * * *